US009772748B2

(12) United States Patent
Khanna

(10) Patent No.: US 9,772,748 B2
(45) Date of Patent: Sep. 26, 2017

(54) USER FEEDBACK PROVIDED FROM WITHIN AN APPLICATION

(71) Applicant: Adobe Systems Incorporated, San Jose, CA (US)

(72) Inventor: Sagar Khanna, Lucknow (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 386 days.

(21) Appl. No.: 14/676,362

(22) Filed: Apr. 1, 2015

(65) Prior Publication Data

US 2016/0291937 A1    Oct. 6, 2016

(51) Int. Cl.
*G06F 9/44*    (2006.01)
*G06F 3/0482*    (2013.01)
*G06F 3/0484*    (2013.01)

(52) U.S. Cl.
CPC .......... *G06F 3/0482* (2013.01); *G06F 3/0484* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 5,566,291 A | * | 10/1996 | Boulton | G06F 11/3055 434/118 |
| 2014/0019854 A1 | * | 1/2014 | Alexander | G06F 17/24 715/266 |
| 2015/0347367 A1 | * | 12/2015 | Berke | G06F 3/04886 715/771 |

* cited by examiner

*Primary Examiner* — Tuan S Nguyen
(74) *Attorney, Agent, or Firm* — Finch & Maloney PLLC

(57) ABSTRACT

A method for providing user feedback leverages background data collected by a software application. A software application includes a feedback mode that is accessible via a keyboard shortcut or the like. Once invoked, the feedback mode disables functionality normally associated with toolbar icons, menu options, scroll bars, and other user interface elements. Certain user interface elements are highlighted or otherwise provided with a modified appearance. Selecting one of these highlighted user interface elements displays a feedback panel. The feedback panel enables the user to submit context-specific feedback. In the background, in a way that requires little or no user input, the feedback mode compiles data that provides context to the submitted feedback. The collected feedback can be transmitted directly to a developer's feedback portal, or can optionally be queued for later transmission if a network connection is unavailable at the time the feedback is actually collected.

20 Claims, 10 Drawing Sheets

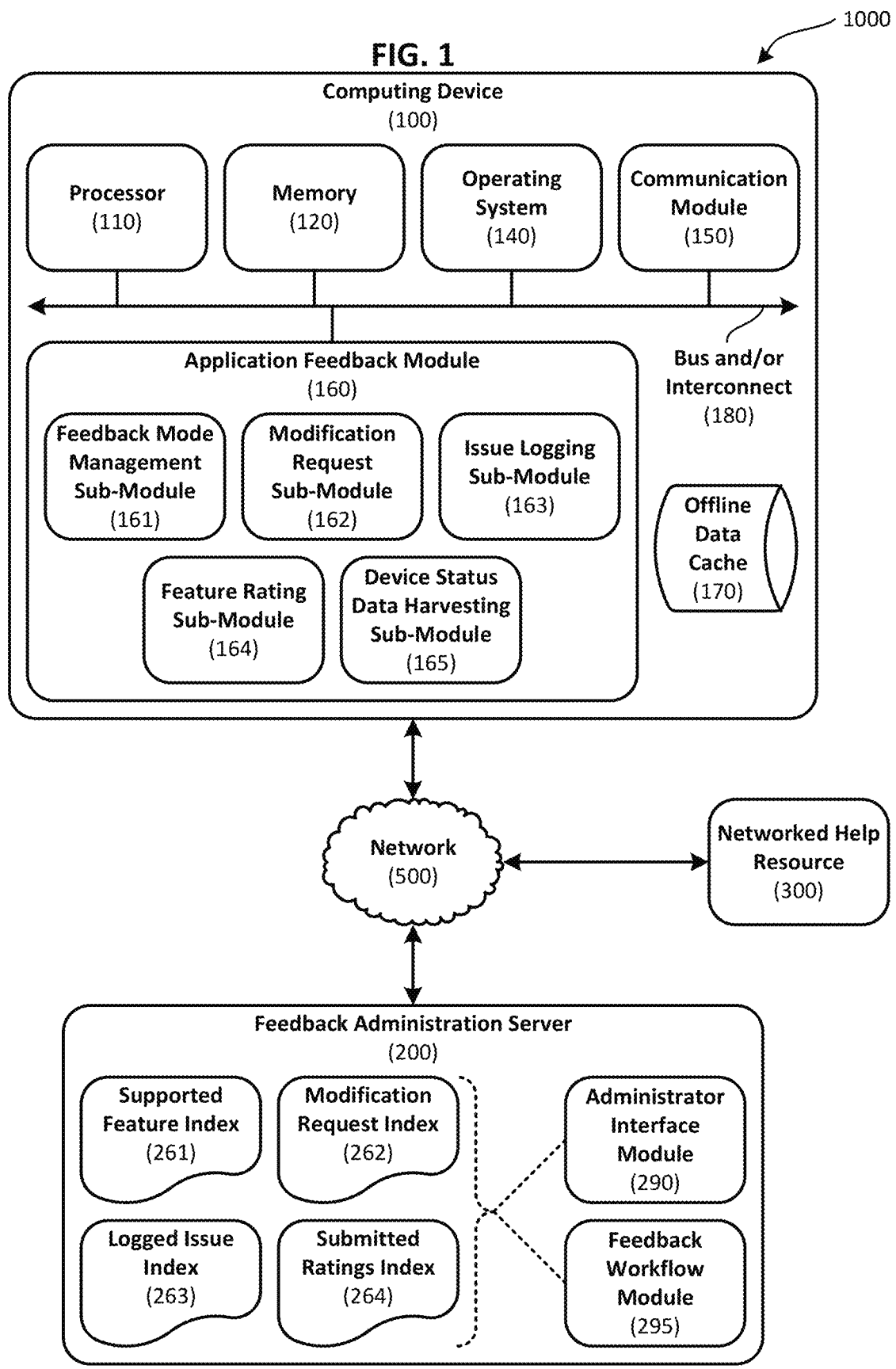

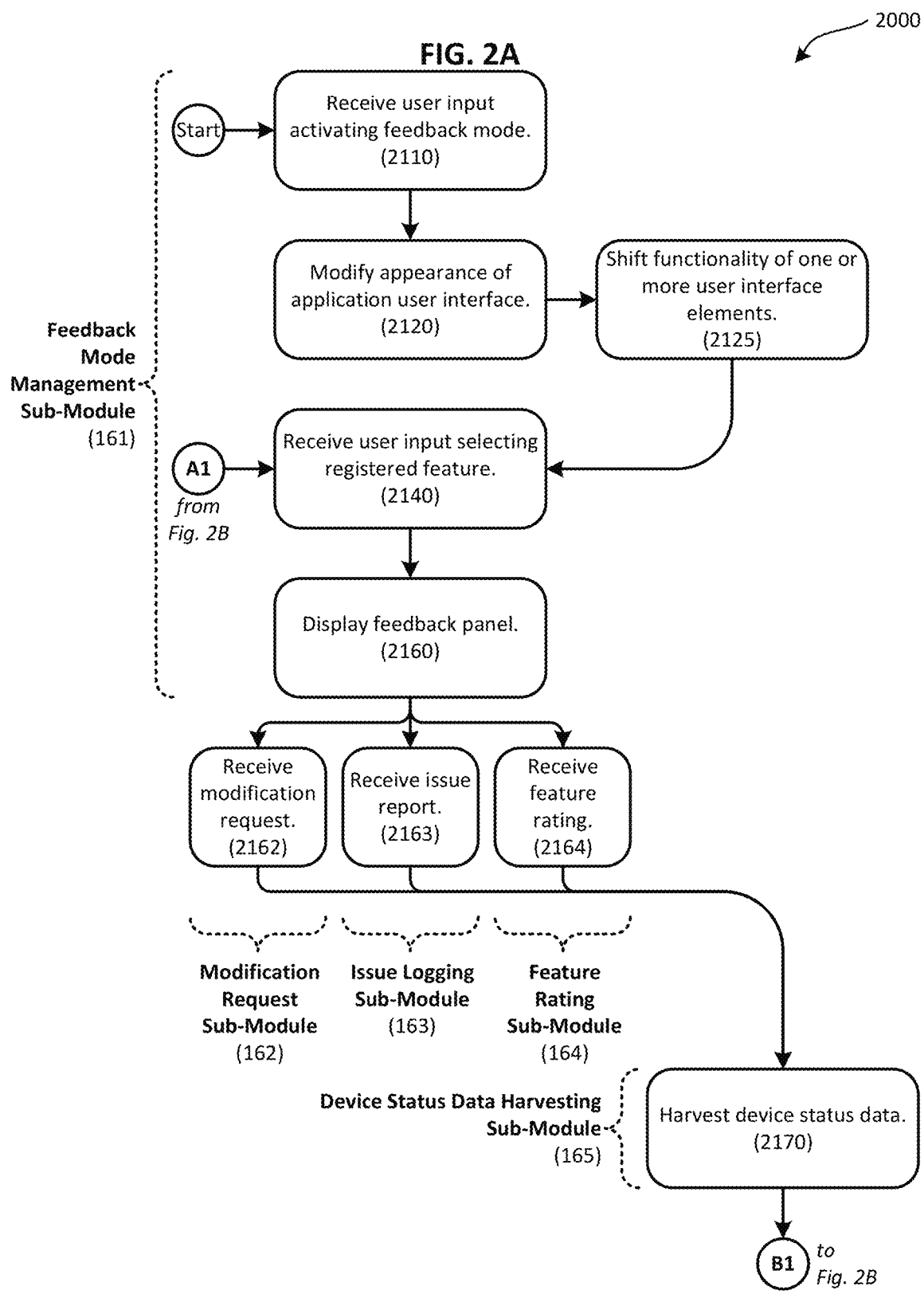

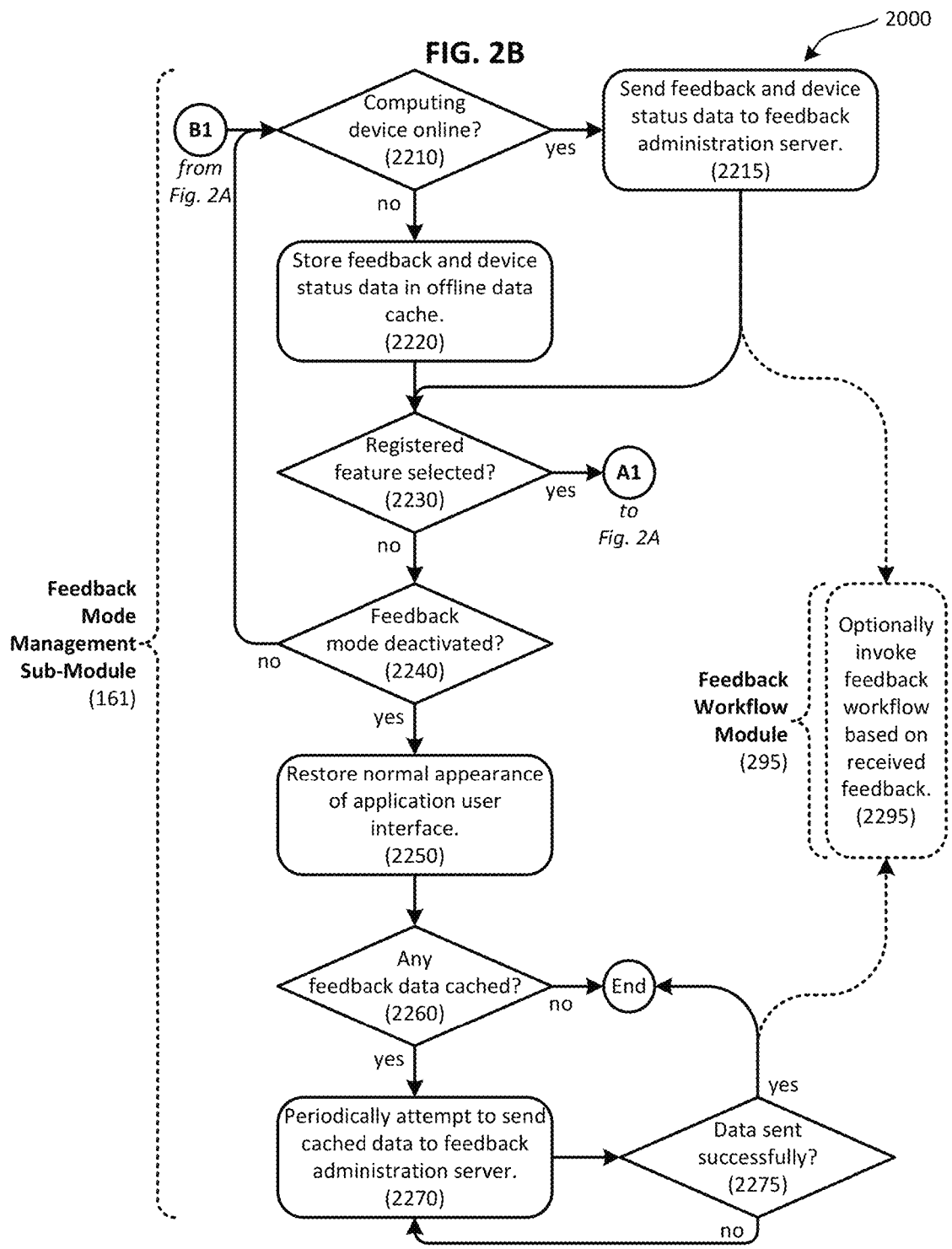

FIG. 3

Normal Mode Dropdown Menu Option (3120)
Normal Mode Menu Bar Text Field (3105)
User Identifier (3300)
Feedback Mode Toggle Icon (3115)

Normal Mode Menu Bar (3100)

Normal Mode Toolbar Icons (3210)

Normal Mode Toolbar (3200)

3000

≋ Declaration.PDF — Clay Viewer | user@example.com | − □ ×

File  Edit  View  Window  Help  90.3% ▼

New Window
Cascade    Shift + Ctrl + J
Tile ▶
Minimize All Windows
✓ 1 Declaration.PDF When in the course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of

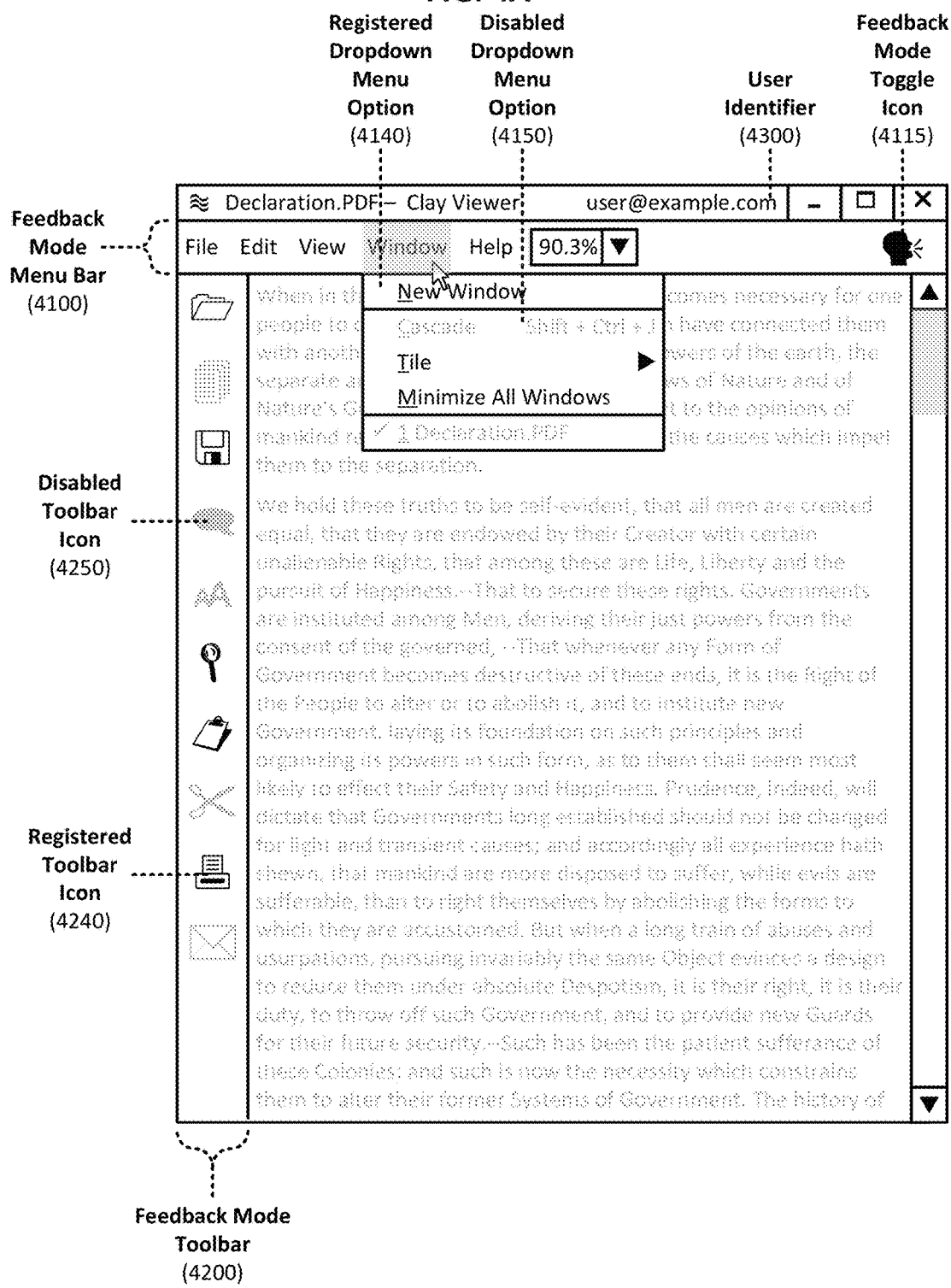

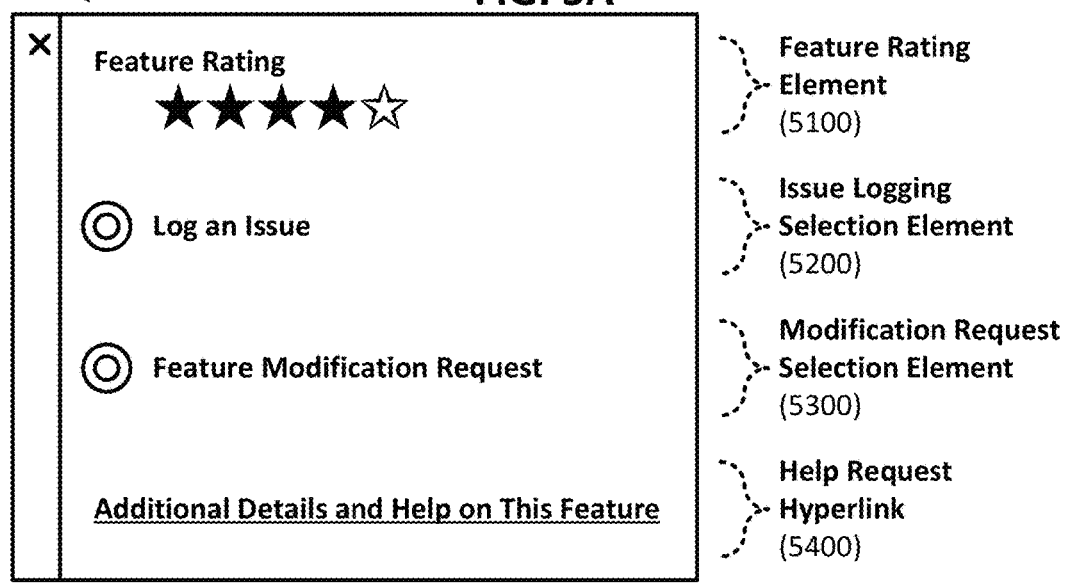

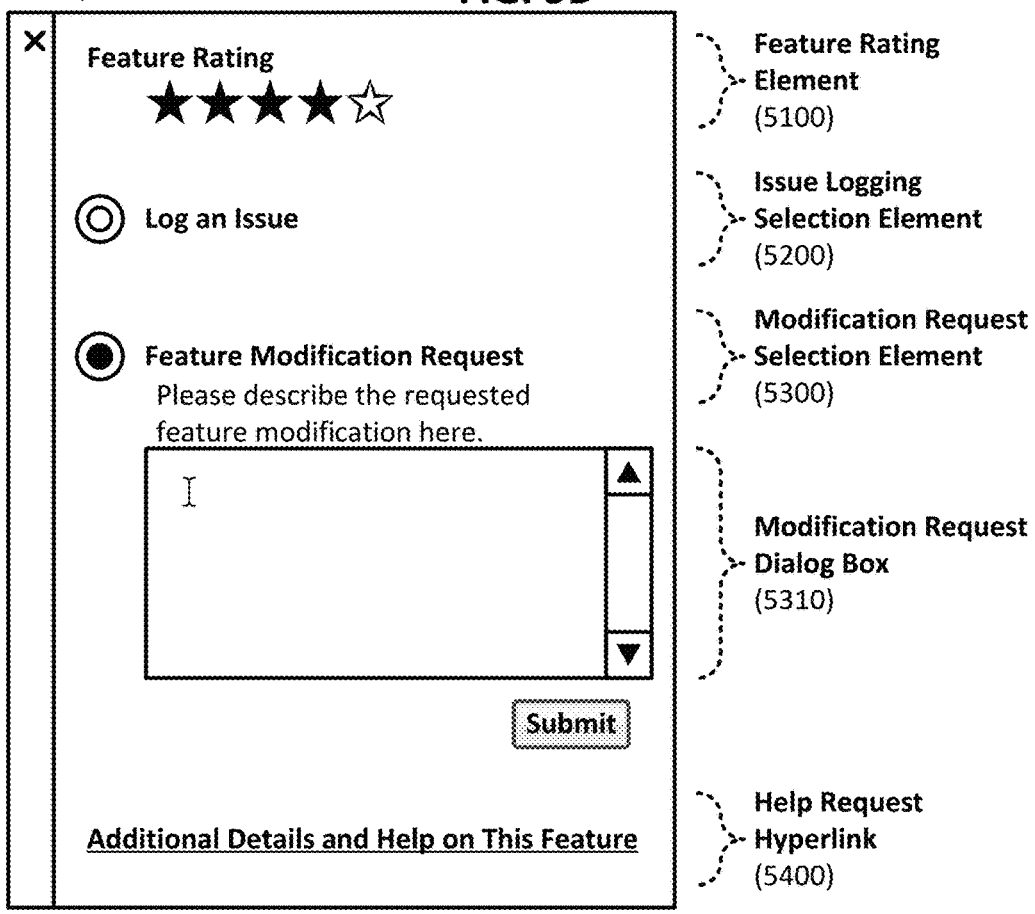

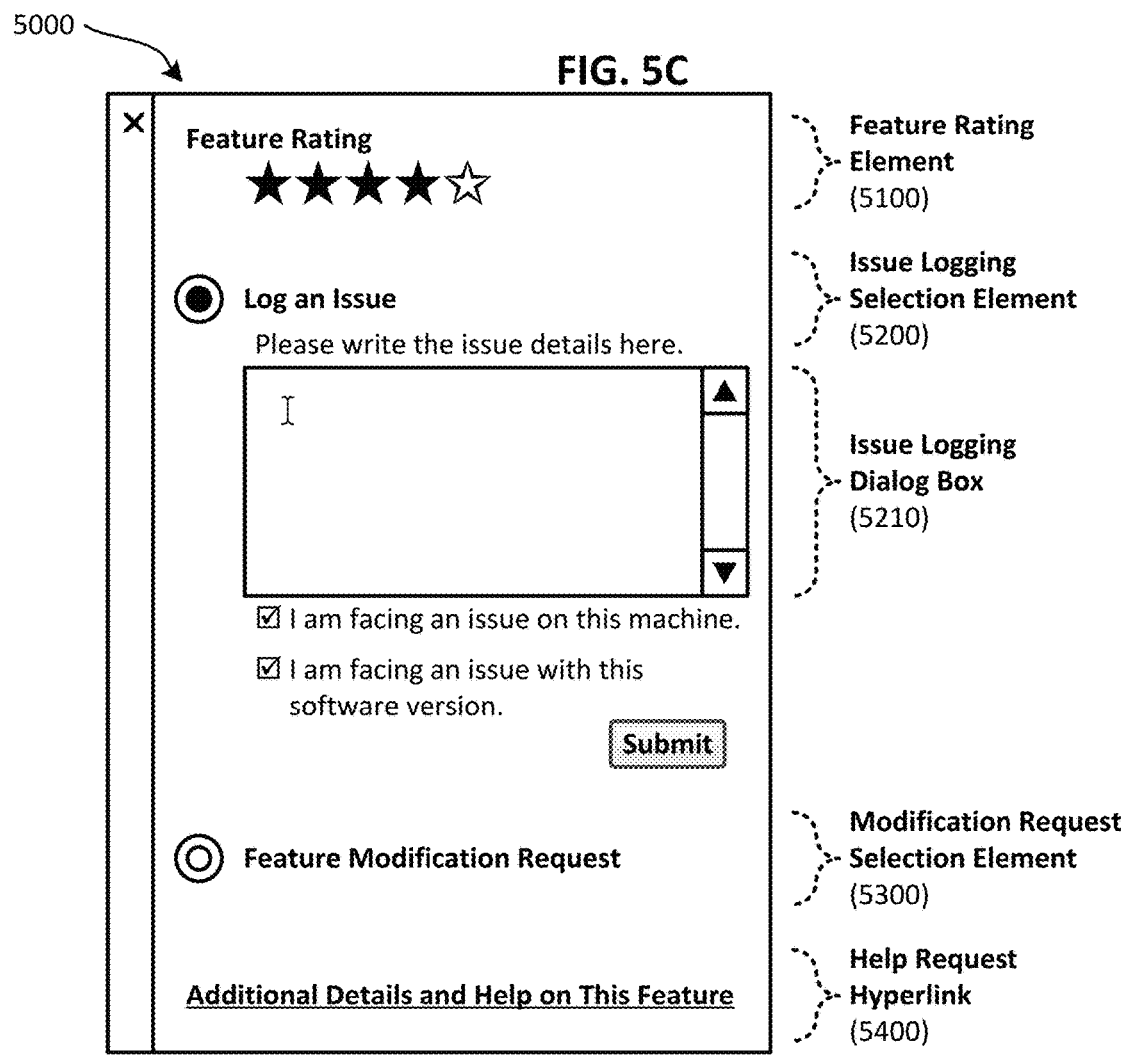

FIG. 6

Receive first user input that invokes a feedback mode in a software application, wherein the software application includes a first feature accessible via a first user interface element, and a second feature accessible via a second user interface element.
(6100)

↓

Disable the first user interface element in response to invoking the feedback mode, wherein the first feature cannot be accessed via the disabled first user interface element.
(6200)

↓

Shift functionality associated with the second user interface element in response to invoking the feedback mode.
(6300)

↓

Receive a selection of the second user interface element in the feedback mode.
(6400)

↓

Display a feedback panel in response to receiving the selection of the second user interface element.
(6500)

↓

Receive second user input via the feedback panel.
(6600)

↓

Harvest status data associated with the software application.
(6700)

↓

Send the second user input and the status data to a feedback administration server.
(6800)

6000

USER FEEDBACK PROVIDED FROM WITHIN AN APPLICATION

FIELD OF THE INVENTION

This application relates generally to user feedback functionality for a software application, and more specifically to user feedback functionality that leverages background data collected by a software application.

BACKGROUND

As the processing capacity of digital computers continues to increase, the software applications used in conjunction with such computers have become more powerful, complex, and feature-laden. For example, consumer applications such as word processors, spreadsheet programs, electronic mail readers, and digital image editing tools often have thousands of features and configuration settings. This creates enormous complexities for software developers and end users alike. For example, a developer faces the challenge of implementing a wide range of functionality, ideally such that all of the different aspects of the software integrate seamlessly. This challenge is compounded by the fact that the developer will often generate several different versions of the software for different computing platforms, geographical regions, consumer segments, and the like. The practical result of these demands is that it is difficult or impossible for the developer to test every possible use case of a given feature. Developers thus rely heavily on users to provide feedback in the form of error reports and feature modification requests. From an end user's perspective, while modern software applications provide a wide range of functionality, the challenge of learning how to effectively use the features provided by a given application can be daunting. As a result, consumers have come to rely on a wide range of resources developed to meet this challenge, including help resources that are integrated into the software itself, as well as resources developed and managed by third parties. In many cases, software vendors have implemented online for a where users and development teams can interact with each other in a way that enables users to better understand how a software application works, and developers to better understand how the software is used.

BRIEF DESCRIPTION OF THE DRAWINGS

FIG. 1 is a block diagram illustrating selected components of an example networked computer system that provides user feedback functionality that leverages background data collected by a software application.

FIGS. 2A and 2B comprise a flowchart illustrating a first example software feedback method for providing user feedback functionality that leverages background data collected by a software application.

FIG. 3 is a screenshot of an example user interface window displayed in a normal mode, wherein a range of software functionality is accessible via a normal mode menu bar and a normal mode toolbar.

FIG. 4A is a screenshot of an example user interface window displayed in a feedback mode, illustrating that activating a feedback mode disables certain user interface elements.

FIG. 5A is a screenshot of an example feedback panel that provides access to feature ranking, issue logging, and modification request functionality.

FIG. 5B is a screenshot of an example feedback panel wherein a modification request dialog box is displayed.

FIG. 5C is a screenshot of an example feedback panel wherein an issue logging dialog box is displayed.

FIG. 6 is a flowchart illustrating a second example software feedback method for providing user feedback functionality that leverages background data collected by a software application.

DETAILED DESCRIPTION

Figure 4B:
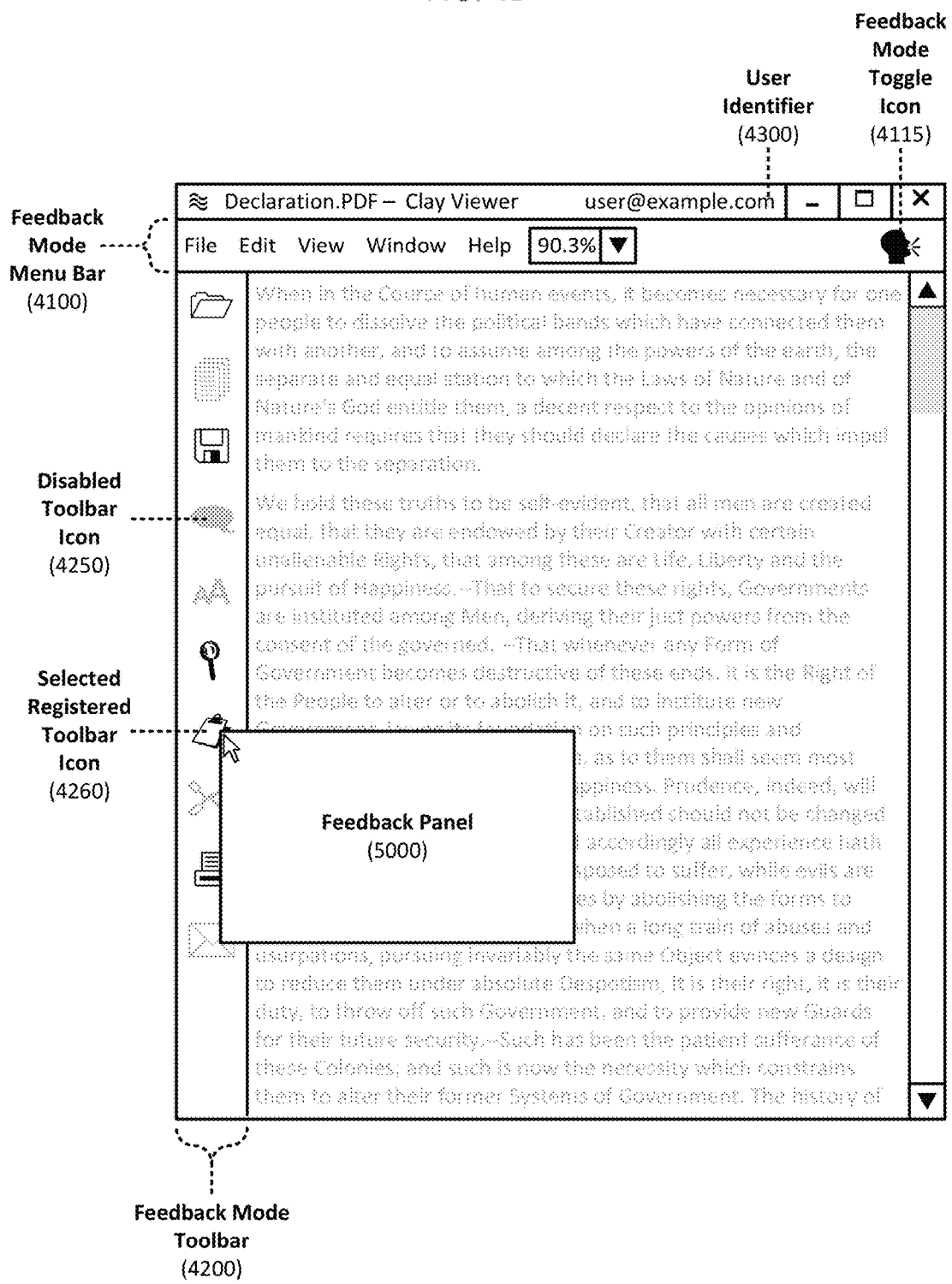
FIG. 4B is a screenshot of an example user interface window displayed in a feedback mode, illustrating that selecting a registered toolbar icon causes a feedback panel to be displayed.

Consumers have come to expect that the software they use is intuitive, powerful, and perhaps most importantly, well-suited to meet the demands of a particular application. Software developers now recognize that user feedback is an important aspect of understanding these consumer expectations, and ultimately, to satisfying consumer demand. For example, a user's error report may alert a developer to a bug that becomes evident only in limited circumstances, and that would otherwise be difficult or impossible for the developer to discover independently. Or a user's feature modification request may alert the developer to an otherwise unknown use case for the software. While some systems have been developed to collect user feedback, these existing systems tend to suffer from a tradeoff that exists between the amount of time a user spends providing feedback and the value of the feedback that is provided. In general, the more time a user devotes to providing feedback, the more likely that a developer will find such feedback valuable. Ideally, a user will provide detailed information with respect to the context of his/her feedback, thus affording a developer who receives that feedback a good opportunity to, for example, effectively investigate an error report or implement a feature modification request. However, as a practical matter, providing thorough feedback is often time consuming, and may even be impossible in certain circumstances. Parameters such as product version, operating system platform, language, and use context should be accurately reported. Some systems require users to log into a registered account before feedback can be submitted. Many users are not inclined to take the time to enter copious details on a feedback form or submit themselves account registration and login procedures. They may not be aware of the relevant technical details that should be reported. Many users therefore elect to forego feedback submission altogether. Even where feedback is provided, the submission may be technically inaccurate or incomplete, and thus be of limited use to a developer. From the developer's standpoint, this represents a substantial obstacle to the collection and aggregation of user feedback.

Thus, and in accordance with certain of the embodiments disclosed herein, an improved method for providing user feedback functionality leverages background data collected by a software application. For example, in one implementation a software application is provided with a feedback mode which a user can access via a keyboard shortcut or a toolbar icon. Once invoked, the feedback mode disables functionality normally associated with toolbar icons, menu options, scroll bars, and other user interface elements. Certain user interface elements are highlighted or otherwise provided with a modified appearance. Selecting one of these highlighted user interface elements causes a feedback panel to be displayed. The feedback panel enables the user to submit context-specific feedback, for example via text entered into a dialog box. In the background, in a way that requires little or no user input, the feedback mode compiles data that provides context to feedback which may be submitted via the feedback panel. Examples of such contextual data may include parameters such as product version, operating system platform, language, the selected user interface element, and other application state data that characterizes the context of the submitted feedback. The feedback panel is optionally further configured to provide access to help resources related to the selected feature. After the user has submitted his/her feedback or is otherwise finished interacting with the feedback panel, the feedback mode can be terminated via another keyboard shortcut or toolbar icon. The collected feedback can be transmitted directly to a developer's feedback portal, or can optionally be queued for later transmission if a network connection is unavailable at the time the feedback is actually collected. Numerous configurations and modifications will be apparent in light of this disclosure.

A number of advantages are associated with certain of the disclosed embodiments. Harvesting data that can be derived by the software application itself reduces the amount of information that the user needs to provide to enable a developer to understand and effectively leverage the submitted feedback. As noted above, reducing the user's burden in this respect makes it more likely that the user will submit feedback in the first place. It also reduces the likelihood that inaccurate or incomplete information is submitted, which is particularly important since the user may not be aware of details such as the software version, operating system version, or hardware components which are in use at a given time. The user may also be unaware of the particular feature area or the specific feature name to which the submitted feedback is related. Moreover, linking the user's feedback to his/her selection of a particular feature in the feedback mode eliminates the need for the user to describe the feature to which the feedback relates. This represents a substantial improvement over existing systems which allow users to provide feedback at an application level rather than at a feature level. It also eliminates the redundancy associated with requiring a user to provide information that can be discerned by the software itself. These and other advantages will be apparent from the foregoing disclosure.

As used herein, the term "feedback" refers, in addition to its ordinary meaning, to information that relates to a computer software application and that is received from a user of the computer software application. Feedback is not limited to information that is provided in any particular format or that contains any particular type of data. For example, in some implementations feedback may consist of a ranking received from the user, such as by selecting a particular number of available stars. In other implementations feedback may consist of a selection of a "like", a "thumbs-up", a "+1", or some other user interface element that is associated with satisfaction (or dissatisfaction). In still other implementations feedback may consist of textual input provided in response to specific questions, or provided in a free-from dialog box. Feedback may also consist of data generated automatically in response to questions presented on a form, such as multiple-choice questions or yes/no questions. For example, in one implementation a device status data harvesting sub-module is configured to generate device and/or software status data in response to selection of a user interface element in a feedback mode; such automatically generated data is encompassed within the term "feedback", as used herein. Thus it will be appreciated that feedback may be received directly from the user, and/or from a software module that generates the feedback in response to user input. It should also be appreciated that feedback is not limited to one particular data type, and thus in certain implementations feedback may comprise a combination of the foregoing data types. The terms "feedback" and "user feedback" may be used interchangeably herein.

In certain implementations feedback recited from a user is submitted to a feedback administration server for subsequent processing, including one or more of recording, analysis, and workflow implementation. Additional details regarding such subsequent processing will be provided in turn. The feedback transmitted to the feedback administration server comprises, for example, one or more of the following: (a) user identification information derived from, for example, a login credential submitted by the user or on the user's behalf when the user invokes the related software application; (b) product identification information extracted from the related software application; (c) product version information extracted from the related software application; (d) product language information extracted from the related software application; (e) operating system platform and/or version information collected from an operating system running on the user's computer; (f) feature identification information generated by the related software application based on the user's selected feature in the feedback mode; (g) application state data extracted from the related software application; (h) a user-generative narrative, optionally supplemented or replaced by data received from the user via other user interface elements; (i) a user-defined rating derived from user input received in the feedback mode; (j) an indication that a user has selected a "like", a "thumbs-up", a "+1", or some other user interface element that is associated with satisfaction (or dissatisfaction); (k) geolocation information collected from a geolocation module that forms part of the user's computer; (l) memory usage information extracted from the operating system; (m) a listing of hardware components coupled to or otherwise associated with the user's computer, optionally including device driver information, which is extracted from the operating system; (n) user history information extracted from an event log maintained by the related software application and/or the operating system; and (o) information characterizing other concurrently executing processing on the user's computer, as extracted from the operating system. Other types of feedback data can be collected in other embodiments.

As used herein, the term "user interface element" refers, in addition to its ordinary meaning, to a visual element appearing in a user interface that is associated with pre-established functionality. Such functionality can be accessed, invoked, or otherwise implemented in response to a user interaction with the element, for example via a mouse click, keyboard input, or gesticulated input provided via a touch sensitive surface. Examples of user interface elements include toolbar buttons, menu options, dropdown menus, scroll bars, windows, frames, dialog boxes, sliders, radio buttons, and the like. A single user interface element can be associated with multiple visual appearances, such as an activated normal appearance and a disabled grayed-out appearance. The terms "user interface element" and "element" may be used interchangeably herein.

As used herein, the terms "software developer" and "developer" encompass, in addition to their ordinary meanings, product managers, product administrators, marketers, data analysts, and programmers. Thus it will be appreciated that, in general, a "software developer" or "developer" is any user who has occasion to access, review, and/or act upon feedback collected from a user of a software application, as disclosed herein.

System Architecture

FIG. 1 is a block diagram schematically illustrating selected components of an example networked computer system 1000 that can be used to implement certain of the embodiments disclosed herein. For example, in one embodiment networked computer system 1000 is capable of providing user feedback functionality that leverages background data collected by a software application. Such embodiments can be understood as involving a series of interactions between a computing device 100, a feedback administration server 200, and optionally, a networked help resource 300. These interactions may occur via a network 500. While one computing device 100 and one feedback administration server 200 are illustrated in FIG. 1, it will be appreciated that other embodiments may include any suitable number of feedback administration servers and any suitable number of computing devices. The architecture and functionality of the various components and subcomponents comprising networked computer system 1000 will be described in turn. However, because the particular functionality provided in a given implementation may be specifically tailored to the demands of a particular application, this disclosure is not intended to be limited to provision or exclusion of any particular resources, components, or functionality.

Computer system 100 may comprise, for example, one or more devices selected from a desktop computer, a laptop computer, a workstation, a tablet computer, a smartphone, a handheld computer, a set-top box, an enterprise class server, or any other such computing device. A combination of different devices may be used in certain embodiments. In the illustrated embodiment, computer system 100 includes, among other things, a processor 110, a memory 120, an operating system 140, a communication module 150, an application feedback module 160, and an offline data cache 170. As can be further seen, a bus and/or interconnect 180 is also provided to allow for inter- and intra-device communications using, for example, communication module 150. Depending on the particular type of device used for implementation, computer system 100 is optionally coupled to or otherwise implemented in conjunction with one or more peripheral hardware components, examples of which include a display, a textual input device (such as a keyboard), and a pointer-based input device (such as a mouse). One or more other input/output devices, such as a touch sensitive display, a speaker, a printer, or a microphone, can be used in other embodiments. For example, in a particular alternative embodiment wherein computer system 100 is implemented in the form of a tablet computer, functionality associated with the particular peripheral hardware components may be provided by a touch sensitive surface that forms part of the tablet computer. Other components and functionality not reflected in the schematic block diagram of FIG. 1 will be apparent in light of this disclosure, and thus it will be appreciated that other embodiments are not limited to any particular hardware configuration.

Processor 110 can be any suitable processor, and may include one or more coprocessors or controllers, such as an audio processor a graphics processing unit, to assist in processing operations of computer system 100. Memory 120 can be implemented using any suitable type of digital storage, such as one or more of a disk drive, a universal serial bus drive, flash memory, and/or random access memory. Operating system 140 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with computer system 100, and therefore may also be implemented using any suitable existing or subsequently developed platform. Communication module 150 can be any appropriate network chip or chipset which allows for wired and/or wireless communication via network 500 to external components such as feedback administration server 200 and/or network help resource 300.

Application feedback module 160 is configured to provide user feedback functionality that leverages background data collected by a software application. Application feedback module 160 can be installed local to computer system 100, as shown in the example embodiment of FIG. 1. However, in alternative embodiments computer system 100 is implemented in a client-server arrangement wherein at least some portion of application feedback module 160 is provided to computer system 100 using an applet (for example a JavaScript applet) or other downloadable module. Such a remotely-provisioned module can be provided in real-time in response to a request from computer system 100 for access to a server having resources that are of interest to the user of computer system 100. The server may be local to network 500 or may be remotely coupled to network 500 by one or more other networks or communication channels. In one implementation the remotely-provisioned module is provided by feedback administration server 200.

Application feedback module 160 is implemented in conjunction with an associated software application. As used herein, an "associated software application" is a software application executed in conjunction with application feedback module 160, such that a user of the associated software application can use application feedback module 160 to provide feedback on the features of the associated software application. For example, where the associated software application is a word processing application, application feedback module 160 allows a user to provide feedback on features of the word processing application. Likewise, where the associated software application is a graphical design application, application feedback module 160 allows a user to provide feedback on features of the graphical design application. In some cases the associated software application may be an operating system, in which case application feedback module 160 allows a user to provide feedback on features of the operating system itself. In general, application feedback module 160 can be implemented in conjunction with an essentially unlimited range of software applications, and in particular, in conjunction with any software application that includes user interface elements linked to software features. The functionality of application feedback module 160 can be accessed by placing the associated software application in a "feedback mode". In one implementation the feedback mode provides access to help resources for features of the associated software application. One example of such a help resource is networked help resource 300.

Still referring to the example embodiment illustrated in FIG. 1, application feedback module 160 includes a feedback mode management sub-module 161 configured to manage aspects of a feedback mode such as activation and deactivation; display and appearance; and feedback caching and transmission. For example, feedback mode management sub-module 161 can be configured to activate and deactivate a feedback mode in response to typing a keyboard shortcut such as "Ctrl+Tab", and/or clicking a designated toolbar icon. Other user inputs can be used in other embodiments. Regardless of how the feedback mode is activated and deactivated, feedback mode management sub-module 161 is further configured to modify the appearance of a user interface of the associated software application in response to such activation and deactivation. For example, in one manifestation of an activated feedback mode, disabled portions of the user interface are greyed-out, while user interface elements for which feedback collection functionality is available are highlighted. Other visual indicia are used in other embodiments. Feedback mode management sub-module 161 is also capable of restoring the user interface to its normal appearance once the feedback mode is deactivated. In implementations where user feedback is collected in the feedback mode, feedback mode management sub-module 161 can also be configured to transmit the collected feedback to feedback administration server 200, or to cache the collected feedback until such transmission becomes possible. In particular, where a connection to feedback administration server 200 is not immediately available, the user feedback can be cached in offline data cache 170 until such connection is available. In certain embodiments offline data cache 170 forms part of, or leverages resources provided by, memory 120.

In certain embodiments application feedback module 160 also includes one or more of a modification request sub-module 162, an issue logging sub-module 163, and a feature rating sub-module 164. Modification request sub-module 162 is configured to receive user feedback related to a requested modification. Likewise, issue logging sub-module 162 is configured to receive user feedback related to an issue (also referred to as an "error" or a "bug") that is encountered. In either case, such feedback can be provided, for example, by providing a narrative description of the requested modification or logged issue. Thus modification request sub-module 162 and issue logging sub-module 163 can each be configured to receive such a narrative, such as via a text entry box or a speech-to-text dictation module. On the other hand, feature rating sub-module 164 is configured to receive user feedback in the form of a ranking, such as a selection of a particular number of available stars (for example, four out of five stars). This can be implemented, for example, via user interface elements such as icons, sliders, or dropdown menus. Other types of feedback may be received in other embodiments, in which case application feedback module 160 may additionally or alternatively include other sub-modules configured to receive such feedback.

In certain embodiments application feedback module 160 further includes a device status data harvesting sub-module 165 that is configured to collect data characterizing various aspects of computing device 100, including data characterizing aspects of the associated software application. Examples of such data include software version, software language, other concurrently executing processes, operating system version, operating system language, and hardware parameters. In implementations where the associated software application provides user login functionality, device status data harvesting sub-module 165 can also be configured to collect user-specific information, such as an account identifier or a user account status. In some cases data characterizing a user's sequence of interactions with the associated software application is collected, thus enabling a developer to understand the operations which may have led up to the reported issue, or which may have prompted the requested feature modification. In some cases a user's geographical location can be collected or estimated as well. The particular type of data that is harvested can be designated in advance, but may also optionally rely on the context in which the feedback is provided. For example, if a user provides feedback with respect to a printing feature in a word processing application, device status data harvesting sub-module 165 may be configured to acquire data that characterizes a printer that is connected to computer system 100. On the other hand, if the user provides feedback with respect to a statistical operator in a spreadsheet application, such data may not be acquired. In some implementations device status data harvesting sub-module 165 provides an option to view the harvested data, thus enabling a user to review such data before it is actually transmitted to feedback administration server 200.

Still referring to the example embodiment illustrated in FIG. 1, feedback administration server 200 comprises an administrator interface module 290, a feedback workflow module 295, and a plurality of indices. The indices include a supported feature index 261, a modification request index 262, a logged issue index 263, and a submitted ratings index 264. Administrator interface module 290 enables a software developer to define frontend operational parameters that establish, for example, which software features are associated with feedback collection functionality, and what types of information are to be collected by device status data harvesting sub-module 165. These parameters can be logged in supported feature index 261. For example, in the context of a digital imaging software application having thousands of features and settings, a software developer may elect to enable feedback collection functionality for only a few dozen of the most popular features. The software developer may also specify the types of operational data that should be collected when feedback is provided on certain features. For example, when feedback is provided on a print preview feature, the developer may specify that device driver information be automatically extracted from the operating system by device status data harvesting sub-module 165. A software developer can add additional feedback functionality to an existing system by updating the parameters logged in supported feature index 261. While the functionality disclosed herein is described as being used by a software developer, it will be appreciated that, in general, such functionality can be used by users in any suitable role, including product managers, product administrators, marketers, data analysts, programmers, and others.

Administrator interface module 290 also enables the developer to perform backend analysis of user feedback that is collected from one or more computing devices, such as computing device 100 illustrated in FIG. 1. Modification requests can be stored in modification request index 262, logged issues can be stored in logged issue index 263, and feature ratings can be stored in submitted ratings index 264. Administrator interface module 290 can be configured to extract information from one or more of these indices and to present it to a software developer for further analysis. In some cases administrator interface module 290 provides a data viewer that allows the developer to review the raw data. However in other embodiments administrator interface module 290 additionally or alternatively includes data analysis functionality that enables the developer to perform a more sophisticated analysis of the indexed data. For example, in one particular implementation the indexed data can be correlated with data collected by device status data harvesting sub-module 165, thereby allowing the developer to execute queries against the indexed data. This enables the developer to, for example, reveal the average rating submitted by users of a particular operating system, or display issues logged only from users working with a particular language version of an associated software application.

Referring again to the example embodiment illustrated in FIG. 1, feedback administration server 200 further comprises feedback workflow module 295. Feedback workflow module is optionally configured to invoke one or more workflows in response to feedback received from computing device 100. For example, in one implementation receipt of a rating that is below a threshold level causes a notification to be sent to a particular development team. In another implementation receipt of a feature modification request or a logged issue causes an acknowledgement email to be sent to the user who submitted the feedback. Such an email may optionally provide the user with additional contact information in the event that the user wishes to follow up directly with a developer regarding the submitted feedback. The feedback is optionally routed differently depending on information harvested from computing device 100. For example, in an organization with different teams assigned to the development of different language versions of an associated software application, feedback can be routed to the appropriate development team based on the particular version of the software which is running at computing device 100. These represent just a few examples of the workflows which may be invoked in response to submitted feedback, and it will be appreciated that a wide range of other workflows may be implemented in other embodiments.

The embodiments disclosed herein can be implemented in various forms of hardware, software, firmware, or special purpose processors. For example, in one embodiment a non-transitory computer readable medium has instructions encoded thereon that, when executed by one or more processors, cause one or more of the user feedback methodologies disclosed herein to be implemented. The instructions can be encoded using one or more suitable programming languages, such as C, C++, object-oriented C, JavaScript, Visual Basic .NET, BASIC, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented using JavaScript or another suitable browser-based technology.

The functionalities disclosed herein can optionally be incorporated into a variety of different associated software applications, such as image editing software applications, word processing applications, desktop publishing applications, and presentation applications. For example, a word processing application can be provided with a feedback mode through which a user can provide feedback that is automatically supplemented with data collected by data harvesting sub-module 165. The computer software applications disclosed herein may include a number of different modules, sub-modules, or other components of distinct functionality, and can provide information to, or receive information from, still other components and services. These modules can be used, for example, to communicate with peripheral hardware components or networked computing resources such as networked help resource 300. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 1 may comprise additional, fewer, or alternative subcomponents.

The aforementioned non-transitory computer readable medium may be any suitable medium for storing digital information, such as a hard drive, a server, a flash memory, or random access memory. In alternative embodiments, the computer and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input and output ports for receiving and transmitting data, respectively, and a number of embedded routines for carrying out the various functionalities disclosed herein. It will be apparent that any suitable combination of hardware, software, and firmware can be used, and that the present disclosure is not intended to be limited to any particular system architecture.

Methodology

FIGS. 2A and 2B comprise a flowchart illustrating an example software feedback methodology 2000 for providing user feedback functionality that leverages background data collected by a software application. As can be seen, methodology 2000 includes a number of phases and sub-processes, the sequence of which may vary from one embodiment to another. However, when considered in the aggregate, these phases and sub-processes form a complete user feedback collection process that is responsive to user commands in accordance with certain of the embodiments disclosed herein. These methods can be implemented, for example, using the system architecture illustrated in FIG. 1. However other system architectures can be used in other embodiments, as will be apparent in light of this disclosure. To this end, the correlation of the various functionalities shown in FIGS. 2A and 2B to the specific components illustrated in FIG. 1 is not intended to imply any structural and/or use limitations. Rather other embodiments may include varying degrees of integration where multiple functionalities are performed by one system or by separate systems. For instance, in an alternative embodiment a single feedback processing sub-module can be used to perform modification request processing, issue logging, and feature rating. Thus other embodiments may have fewer or more modules and/or sub-modules depending on the granularity of implementation. Numerous variations and alternative configurations will be apparent in light of this disclosure.

Example software feedback methodology 2000 commences with feedback mode management sub-module 161 receiving user input activating a feedback mode. See reference number 2110 in FIG. 2A. In one implementation the feedback mode is activated in response to detection of a keyboard shortcut such as 'Ctrl+Tab". In another implementation the feedback mode is activated in response to selecting a designated option from a dropdown menu or selecting a designated toolbar icon. In still other embodiments the feedback mode is activated in response to a voice command. In some cases the feedback mode can be activated using any one of a variety of different techniques, such as using either a keyboard shortcut or a toolbar icon. FIG. 3 is a screenshot of an example user interface window 3000 displayed in a normal mode, wherein a range of software functionality is accessible via a normal mode menu bar 3100 and a normal mode toolbar 3200. The normal mode menu bar 3100 includes a normal mode menu bar text field 3105 and a feedback mode toggle icon 3115. The normal mode toolbar 3200 includes a plurality of normal mode toolbar icons 3210. In such embodiments the feedback mode can be activated by clicking, tapping, or otherwise selecting feedback mode toggle icon 3115.

Some software applications support user login functionality as a way to facilitate customization and access to cloud-based resources, including cloud-based storage of digital assets belonging to a specific user. In such case, a user may login to his/her account before or after activating the feedback mode. Where the user is logged into his/her account, device status data harvesting sub-module 165 can optionally collect user-specific information, including contact information, thus providing a software developer or other administrator with additional insight into the context of the submitted feedback. For example, associating user identification information with feature ratings allows an administrator to evaluate how many unique users gave a particular feature rating. In one embodiment, such as illustrated in FIG. 3, a user identifier 3300 is displayed in user interface window 3000 to indicate that the user is logged into a given software application, and that user-specific information may be collected by device status data harvesting sub-module 165.

Once the feedback mode has been activated, feedback mode management sub-module 161 is further configured to modify the appearance of the application user interface. See reference numeral 2120 in FIG. 2A. In general, this can be accomplished through the use of visual cues that indicate a distinction between active and disabled features in the feedback mode. To provide a more specific example, in one implementation portions of the user interface which are disabled or which have no associated functionality in feedback mode are greyed-out. FIG. 4A is a screenshot of an example user interface window 4000 displayed in a feedback mode, illustrating that activating the feedback mode disables certain user interface elements. User interface window 4000 includes a feedback mode menu bar 4100 and a feedback mode toolbar 4200. Feedback mode menu bar 4100 includes a feedback mode toggle icon 4115 having a similar or identical appearance as feedback mode toggle icon 3115 illustrated in FIG. 3. This allows a user to toggle in and out of feedback mode. Feedback mode toolbar 4200 includes a plurality of registered toolbar icons 4240 and a plurality of disabled toolbar icons 4250. Registered toolbar icons 4240 have a similar or identical appearance as normal mode toolbar icons 3210 illustrated in FIG. 3. On the other hand, disabled toolbar icons 4250, and other user interface elements which have no associated functionality in feedback mode, have a greyed-out appearance. For example, in one implementation a user is prevented from modifying text in a word processing document when a word processing application is switched into feedback mode. In such implementations the word processing text entry window is greyed-out to indicate that this functionality has been disabled. In certain embodiments feedback mode management sub-module 161 determines which portions of the user interface are associated with feedback mode functionality based on supported feature index 261 stored at feedback administration server 200. The modified appearance enables the user to quickly and easily identify which user interface elements are associated with feedback mode functionality, as will be described in turn. In one embodiment, such as illustrated in FIG. 4A, a user identifier 4300 is displayed in user interface window 4000 to indicate that the user is logged into a given software application, and that user-specific information may be collected by device status data harvesting sub-module 165.

The user interface window 4000 illustrated in FIG. 4A also includes a feedback mode menu bar 4100. Feedback mode menu bar 4100 includes a plurality of menu options such as "File", "Edit", "View", "Window", and "Help". Selecting one of these menu options causes a dropdown menu to appear, wherein the dropdown menu comprises additional menu options. FIG. 4A illustrates that certain of the menu options, such as a registered dropdown menu option 4140, appears essentially the same as a corresponding normal mode dropdown menu option 3120 illustrated in FIG. 3. This indicates a menu option that is associated with a feature that is active in feedback mode, as will be desired in turn. However, other menu options, such as a disabled dropdown menu option 4150, are greyed-out, thus indicating that the menu option is disabled and has no associated functionality in feedback mode. In implementations where all of the menu options in a dropdown menu are disabled in the feedback mode, the menu option label itself can be greyed-out. See, for example, the "File" and "Help" menu options in feedback mode menu bar 4100. On the other hand, a normal appearance of a menu option label indicates that the dropdown menu or submenu contains at least one menu option that is associated with a feature that is active in feedback mode. See, for example, the "Edit", View", and "Window", menu options in feedback mode menu bar 4100, as well as the "Tile" dropdown submenu option.

In certain of the example embodiments disclosed and illustrated herein, user interface elements associated with features which are active in feedback mode have a normal appearance, while user interface elements associated with features which are disabled in feedback mode have a greyed-out appearance. However, other configurations can be implemented in other embodiments. For example, in an alternative embodiment user interface elements associated with features which are active in feedback mode have a modified appearance, for example as a result of being rendered in a different color, being highlighted, using a different icon, or being enclosed in a border. In such alternative embodiments user interface elements associated with features which are disabled in feedback mode have a normal appearance.

Thus, feedback mode management sub-module 161 is also configured to shift functionality of one or more user interface elements in response to activation of the feedback mode. See reference numeral 2125 in FIG. 2A. In the case of a registered user interface element, this involves shifting from the normal functionality associated with the element to a feedback collection functionality. In the case of a disabled user interface element, this involves shifting from the normal functionality associated with the element to a lack of functionality, or in other words, it involves disabling the user interface element. Thus in certain implementations multiple user interface elements have shifted functionality upon activation of the feedback mode. This shift in functionality can be appreciated by comparing the normal mode user interface window 3000 illustrated in FIG. 3 with the feedback mode user interface window 4000 illustrated in FIGS. 4A and 4B. In FIG. 3, a "clipboard" toolbar icon (✂) is associated with a clipboard access operation, while in FIGS. 4A and 4B, this same icon is associated with feedback submission functionality. Likewise, in FIG. 3 a "mail" toolbar icon (✉) is associated with electronic mail functionality, while in FIGS. 4A and 4B, this same icon is disabled, as indicated by its greyed-out appearance, and thus is not associated with any functionality.

Once feedback mode has been activated, feedback mode management sub-module 161 can be configured to receive user input selecting a registered feature. See reference numeral 2140 in FIG. 2A. This can be accomplished by clicking, tapping, or otherwise selecting a user interface element associated with a feature that is active in feedback mode, as described above. In certain embodiments, a user will select a user interface element associated with a feature about which he/she wishes to provide feedback. In response to such a selection, a feedback panel is displayed. See reference numeral 2160 in FIG. 2A. FIG. 4B is a screenshot of an example user interface window 4000 displayed in a feedback mode, illustrating that selecting a registered toolbar icon causes a feedback panel 5000 to be displayed. In particular, FIG. 4B illustrates feedback panel 5000 positioned adjacent to a selected registered toolbar icon 4260, thus indicating that the user wishes to provide feedback related to functionality associated with icon 4260. While FIG. 4B illustrates a simplified view of feedback panel 5000, FIG. 5A provides a more detailed illustration of feedback panel 5000, wherein feedback panel 5000 is configured to provide access to feature ranking, issue logging, and modification request functionality. Feedback panel 5000 includes a feature rating element 5100, an issue logging selection element 5200, and a modification request selection element 5300. Feedback panel 5000 also optionally includes a help request hyperlink 5400 which can provide access to additional information or resources relating to a feature associated with selected registered toolbar icon 4260, thus providing context-sensitive help. In one embodiment such additional information or resources are provided by networked help resource 300. In certain embodiments the particular functionality provided via feedback panel 5000 depends on the particular feature selected from feedback mode.

Modification request sub-module 162 can be configured to receive a modification request via feedback panel 5000. See reference numeral 2162 in FIG. 2A. In one implementation, this is accomplished when the user selects modification request selection element 5300, which in turn causes a modification request dialog box 5310 to appear. FIG. 5B is a screenshot of feedback panel 5000 having modification request dialog box 5310 displayed. Modification request dialog box 5310 provides the user with a place to describe his/her request in narrative fashion. Other user interface elements are optionally provided to help the user submit supplemental information about the modification request. Dialog box 5310 is optionally prepopulated with data collected by device status data harvesting sub-module 165, as disclosed herein. In some implementations prepopulated data can be modified by the user, while in other implementations the prepopulated data is fixed and cannot be modified. In still other implementations data collected by device status data harvesting sub-module 165 is transmitted independently of the user's input in dialog box 5310. As described herein, feedback workflow module 295 is optionally configured to route an incoming feature modification request appropriately depending on the context in which the feature modification request is submitted.

Issue logging sub-module 163 can be configured to receive an issue report via feedback panel 5000. See reference numeral 2163 in FIG. 2A. In one implementation, this is accomplished when the user selects issue logging selection element 5200, which in turn causes an issue logging dialog box 5210 to appear. FIG. 5C is a screenshot of feedback panel 5000 having issue logging dialog box 5210 displayed. Issue logging dialog box 5210 provides the user with a place to describe his/her issue in narrative fashion. Other user interface elements are optionally provided to help the user incorporate supplemental information into the issue report. Dialog box 5210 is optionally prepopulated with data collected by device status data harvesting sub-module 165, as disclosed herein. In some implementations prepopulated data can be modified by the user, while in other implementations the prepopulated data is fixed and cannot be modified. In still other implementations data collected by device status data harvesting sub-module 165 is transmitted independently of the user's input in dialog box 5210. As described herein, feedback workflow module 295 is optionally configured to route an incoming issue report appropriately depending on the context in which the issue report is submitted.

As illustrated in FIG. 5C, a checkbox is optionally displayed in conjunction with issue logging dialog box 5210, wherein the checkbox allows the user to indicate whether or not the issue being reported manifests on the computing device used to issue the report. This provides an additional degree of extensibility and flexibility to the feedback system by making it easier for a user to report issues, particularly those which may adversely affect the functionality of the feedback reporting system itself. If the user indicates that the issue being reported does not manifest on the computing device used to issue the report, then information collected by device status data harvesting sub-module 165 will not be transmitted with the issue report. In an alternative implementation, if the user indicates that the issue being reported does not manifest on the computing device used to issue the report, the user is given an opportunity to modify the data collected by device status data harvesting sub-module 165 before such data is forwarded to feedback administration server 200. In one such implementation issue logging dialog box 5210 is populated with data collected by device status data harvesting sub-module 165, and the use is allowed to modify such information as appropriate.

Still referring to the example embodiment illustrated in FIG. 5C, a checkbox is optionally displayed in conjunction with issue logging dialog box 5210, wherein the checkbox allows the user to indicate whether or not the issue being reported manifests with a different software version. In one implementation such a checkbox is selected by default. Deselecting such a checkbox provides the user with an opportunity to specify a different version of the software that manifests the reported issue. While checkboxes are illustrated in conjunction with issue logging dialog box 5210 in FIG. 5C, in other implementations similar checkboxes are optionally provided in conjunction with modification request dialog box 5310.

Feature rating sub-module 164 can be configured to receive a feature rating via feedback panel 5000. See reference numeral 2164 in FIG. 2A. In one implementation, this is accomplished based on user interaction with a feature rating element 5100, one example of which is illustrated in FIG. 5A. In such an implementation, the user can indicate his/her satisfaction with a feature by selecting an appropriate number of stars. Other user interface elements that can be used to receive the rating include a dropdown menu, a slider, a text entry field, or a set of radio buttons. In a modified embodiment, submission of a rating below a predetermined threshold causes a feedback dialog box to be displayed, thus providing the user with an opportunity to provide more detailed feedback. Feature rating sub-module 164 thus provides feature-level ratings which represent an improvement over more generalized software-level ratings.

Referring again to FIG. 2A, device status data harvesting sub-module 165 is configured to harvest device status data. See reference number 2170 in FIG. 2A. Device status data can be harvested in response to a variety of events, including but not limited to activation of the feedback mode, display of feedback panel 5000, and interaction with user interface elements in feedback panel 5000. Device status data harvesting sub-module 165 can be configured to collect a wide range of data, including but not limited to software version, software language, other concurrently executing processes, operating system version, operating system language, and hardware parameters. Data may additionally or alternatively be collected from system logs, thus revealing history associated with computing device 100. In implementations where software provides user login functionality, device status data harvesting sub-module 165 can also be configured to collect user-specific information, such as an account identifier. Thus, in certain implementations data characterizing a particular user's sequence of interactions with the software application and/or computing device 100 is collected, thereby making it easier for a developer to understand the operations which may have let up to the reported issue, or which may have prompted the requested feature modification. The particular type of data that is harvested can be designated in advance, but may also optionally rely on the context in which the feedback is provided.

In certain embodiments feedback mode management sub-module 161 is configured to determine whether computing device 100 is online, for example by determining whether it is possible to establish a connection with feedback administration server 200. See reference numeral 2210 in FIG. 2B. If computing device 100 is online, the feedback data, including any harvested device status data, is sent to feedback administration server 200. See reference numeral 2215 in FIG. 2B. In this case the contents of offline data cache 170 can be cleared. However, if computing device 100 is not online, the feedback data, including any harvested device status data, is stored in offline data cache 170. See reference numeral 2220 in FIG. 2B. This allows feedback data and device status data to be collected and queued even when computing device 100 is offline.

Regardless of whether computing device 100 is online or offline, and while the user interface remains in feedback mode, feedback mode management sub-module 161 is further configured to determine whether another registered feature is selected, for example as a result of another registered toolbar icon 4240 being selected. See reference numeral 2230 in FIG. 2B. If so, additional feedback can be collected, as described herein. If another registered feature is not selected, feedback mode management sub-module 161 is configured to determine whether the feedback mode is deactivated. See reference numeral 2240 in FIG. 2B. The feedback mode can be deactivated just as it is activated, such as in response to typing a keyboard shortcut or selecting feedback mode toggle icon 4215. If the feedback mode is not deactivated, feedback mode management sub-module 161 can continue to periodically attempt to send any cached feedback data to feedback administration server 200. Feedback mode management sub-module 161 can also continue to respond to selection of any registered toolbar icons 4240.

Where feedback mode is deactivated, feedback mode management sub-module 161 is configured to restore the normal appearance of the application user interface, such as illustrated in FIG. 3. See reference numeral 2250 in FIG. 2B. Once the feedback mode is deactivated, it can be determined whether offline data cache 170 contains feedback data which still has not been transmitted to feedback administration server 200. See reference numeral 2260 in FIG. 2B. If not, method 2000 can be considered complete. On the other hand, if offline data cache 170 still contains data which should be transmitted to feedback administration server 200, feedback mode management sub-module 161 can be configured to periodically attempt to send such data to feedback administration server 200. See reference number 2270 in FIG. 2B. Once the data is successfully transmitted, cache 170 can be cleared and method 2000 can be considered complete. See reference numeral 2275 in FIG. 2B.

Still referring to FIG. 2B, feedback workflow module 295 is optionally configured to invoke a feedback workflow in response to feedback being received at feedback administration server 200. See reference numeral 2295 in FIG. 2B. Examples of such a workflow may include forwarding feedback data to a particular user or user group, sending an acknowledgement communication to the user who submitted the feedback, and logging the received feedback data in one or more indices maintained at feedback administration server 200. An acknowledgement sent to the user who submitted the feedback optionally includes a reference number that would allow the user to inquire into the status of the submitted feedback at a later time. Feedback data is optionally logged in conjunction with corresponding device status data, thus allowing the feedback data to be analyzed on a segmented basis. For example, this enables a developer to review feedback submitted from users of a particular operating system, or to view average ratings for different versions of a particular software application. As another example, this also allows product administrators to better understood how the software is being used, and how the software might be modified to better conform to such use patterns. This enables administrators to determine which features might be added or modified in subsequent releases. These represent just a few examples of the workflows which may be invoked in response to submitted feedback, and it will be appreciated that a wide range of other workflows may be implemented in other embodiments.

In one implementation a software developer can view collected user feedback relating to a particular software application using the software application itself. In such cases application feedback module 160 is configured to detect authentication of an authorized user. This may occur, for example, upon receipt of an administrator's or a developer's login credential. Once the authorized user is authenticated, activating the feedback mode causes additional information to be displayed, such as an average feature rating, a digest of collected feature modification requests, or a summary of collected issue reports. Such information can be requested and received from feedback administration server 200. This allows a software developer or other authorized administrator to review feedback related to a particular software application using the software application itself.

Further Example Embodiments

Numerous variations and configurations will be apparent in light of this disclosure. For instance, one example embodiment provides a computer-implemented software application feedback submission method 6000 that is illustrated in FIG. 6. Method 6000 comprises receiving first user input that invokes a feedback mode in a software application. The software application includes a first feature accessible via a first user interface element, and a second feature accessible via a second user interface element. See reference numeral 6100 in FIG. 6. Method 6000 further comprises disabling the first user interface element in response to invoking the feedback mode. The first feature cannot be accessed via the disabled first user interface element. See reference numeral 6200 in FIG. 6. Method 6000 further comprises shifting functionality associated with the second user interface element in response to invoking the feedback mode. See reference numeral 6300 in FIG. 6. Method 6000 further comprises receiving a selection of the second user interface element in the feedback mode. See reference numeral 6400 in FIG. 6. Method 6000 further comprises displaying a feedback panel in response to receiving the selection of the second user interface element. See reference numeral 6500 in FIG. 6. Method 6000 further comprises receiving second user input via the feedback panel. See reference numeral 6600 in FIG. 6. Method 6000 further comprises harvesting status data associated with the software application. See reference numeral 6700 in FIG. 6. Method 6000 further comprises sending the second user input and the status data to a feedback administration server. See reference numeral 6800 in FIG. 6. In some cases the feedback panel comprises a feature rating element and a dialog box. In some cases the method further comprises (a) making an initial determination that the feedback administration server is offline; (b) storing the second user input and the status data in an offline data cache; and (c) making a subsequent determination that the feedback administration server is online; wherein the second user input and the status data are sent to the feedback administration server in response to the subsequent determination. In some cases disabling the first user interface element further comprises modifying a visual appearance of the first user interface element. In some cases shifting functionality associated with the second user interface element further comprises modifying a visual appearance of the second user interface element. In some cases the method further comprises receiving user login information before receiving the first user input, wherein the status data includes the user login information. In some cases the method further comprises (a) displaying a plurality of selection elements in the feedback panel; and (b) displaying a dialog box in response to receiving a selection associated with one of the plurality of selection elements. In some cases the feedback panel includes a user interface element that enables user modification of the status data before the status data is sent to the feedback administration server. In some cases the method further comprises receiving an acknowledgement notification in response to sending the second user input and the status data to the feedback administration server. In some cases harvesting the status data comprises extracting user-identifying information from the software application.

In such embodiments, examples of the first user input that invokes the feedback mode include a typing a keyboard shortcut, clicking on a toolbar icon, and speaking a voice command. Examples of the second user input received via the feedback panel includes a narrative textual feedback description and a star-based feedback ranking Examples of the first user interface element include a toolbar icon or a menu option that is not associated with functionality, and is thus disabled, in the feedback mode. Examples of the second user interface element include a toolbar icon or a menu option that is registered as being associated with feedback functionality in the feedback mode.

Another example embodiment provides a software application feedback system that comprises a feedback mode management sub-module that forms part of a software application, the feedback mode management sub-module being configured to activate and deactivate a feedback mode in response to first user input. The feedback mode management sub-module is further configured to display a feedback panel in response to selection of a user interface element that is associated with a registered feature of the software application. The system further comprises an issue logging sub-module configured to receive second user input via the feedback panel. The system further comprises a data harvesting sub-module configured to extract status data from the software application. The system further comprises an offline data cache that queues the second user input and the status data if the feedback mode management sub-module cannot communicate with a feedback administration server. In some cases the feedback mode management sub-module is further configured to receive an index of registered features from the feedback administration server. In some cases the second user input is textual input received via a dialog box. In some cases the status data includes user-identifying information. In some cases the feedback mode management sub-module is further configured to transmit the second user input and the status data to an index maintained at the feedback administration server. In some cases the issue logging sub-module is further configured to receive third user input via the feedback panel, wherein the third user input provides an indication with respect to whether the second user input is associated with a computer system on which the feedback mode management sub-module is executing. In some cases the system further comprises a feature rating sub-module configured to receive third user input via the feedback panel. In some cases the feedback mode management sub-module is further configured to send the second user input and the status data to the feedback administration server in response to detecting that the feedback administration server is accessible.

Another example embodiment provides a computer program product encoded with instructions that, when executed by one or more processors, causes a software application feedback submission process to be carried out. The process comprises receiving first user input that invokes a feedback mode in a software application. The software application includes a plurality of user interface elements. The process further comprises, in response to invoking the feedback mode, disabling a first subset of the user interface elements, and associating a second subset of the user interface elements with display of a feedback panel. The process further comprises displaying the feedback panel in response to selection of a particular user interface element in the second subset. The process further comprises receiving second user input via the feedback panel. The process further comprises harvesting status data associated with the software application. The status data includes an identification of a feature associated with the particular user interface element when the feedback mode is not activated. The process further comprises sending the second user input and the status data to a feedback administration server. In some cases the second user input is selected from a group consisting of a selected ranking and a textual input. In some cases the process further comprises (a) making a determination that the feedback administration server is not accessible; and (b) caching the second user input and the status data in an offline data cache.

The foregoing description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto.

What is claimed is:

1. A computer-implemented software application feedback submission method that comprises:
receiving first user input that invokes a feedback mode in a software application, wherein the software application includes a first feature accessible via a first user interface element, and a second feature accessible via a second user interface element;

disabling the first user interface element in response to invoking the feedback mode, wherein the first feature cannot be accessed via the disabled first user interface element;

shifting functionality associated with the second user interface element in response to invoking the feedback mode;

receiving a selection of the second user interface element in the feedback mode;

displaying a feedback panel in response to receiving the selection of the second user interface element;

receiving second user input via the feedback panel;

harvesting status data associated with the software application; and sending the second user input and the status data to a feedback administration server.

2. The computer-implemented method of claim 1, wherein harvesting the status data comprises extracting user-identifying information from the software application.

3. The computer-implemented method of claim 1, wherein the feedback panel comprises a feature rating element and a dialog box.

4. The computer-implemented method of claim 1, further comprising:
making an initial determination that the feedback administration server is offline;
storing the second user input and the status data in an offline data cache; and
making a subsequent determination that the feedback administration server is online;
wherein the second user input and the status data are sent to the feedback administration server in response to the subsequent determination.

5. The computer-implemented method of claim 1, wherein disabling the first user interface element further comprises modifying a visual appearance of the first user interface element.

6. The computer-implemented method of claim 1, wherein shifting functionality associated with the second user interface element further comprises modifying a visual appearance of the second user interface element.

7. The computer-implemented method of claim 1, further comprising receiving user login information before receiving the first user input, wherein the status data includes the user login information.

8. The computer-implemented method of claim 1, further comprising:
displaying a plurality of selection elements in the feedback panel; and
displaying a dialog box in response to receiving a selection associated with one of the plurality of selection elements.

9. The computer-implemented method of claim 1, wherein the feedback panel includes a user interface element that enables user modification of the status data before the status data is sent to the feedback administration server.

10. The computer-implemented method of claim 1, further comprising receiving an acknowledgement notification in response to sending the second user input and the status data to the feedback administration server.

11. A software application feedback system that comprises:
a processor;
a memory coupled to the processor;
a feedback mode management sub-module that forms part of a software application stored in the memory, the feedback mode management sub-module being configured to
(a) activate a feedback mode in response to first user input,
(b) display a feedback panel in response to selection of a user interface element within the feedback mode, wherein the user interface element is associated with a registered feature of the software application, and wherein the user interface element has a first functionality when the feedback mode is deactivated and a second functionality when the feedback mode is activated, and
(c) shift functionality of the user interface element between the first and second functionalities in response to the first user input;
an issue logging sub-module configured to receive second user input via the feedback panel;
a data harvesting sub-module configured to extract status data from the software application; and
an offline data cache that is stored in the memory and that queues the second user input and the status data if the feedback mode management sub-module cannot communicate with a feedback administration server.

12. The software application feedback system of claim 11, wherein the feedback mode management sub-module is further configured to receive an index of registered features from the feedback administration server.

13. The software application feedback system of claim 11, wherein the second user input is textual input received via a dialog box.

14. The software application feedback system of claim 11, wherein the feedback mode management sub-module is further configured to transmit the second user input and the status data to an index maintained at the feedback administration server.

15. The software application feedback system of claim 11, wherein the issue logging sub-module is further configured to receive third user input via the feedback panel, wherein the third user input provides an indication with respect to whether the second user input is associated with a computer system on which the feedback mode management sub-module is executing.

16. The software application feedback system of claim 11, further comprising a feature rating sub-module configured to receive third user input via the feedback panel.

17. The software application feedback system of claim 11, wherein the feedback mode management sub-module is further configured to send the second user input and the status data to the feedback administration server in response to detecting that the feedback administration server is accessible.

18. A non-transitory computer readable medium encoded with instructions that, when executed by one or more processors, causes a software application feedback submission process to be carried out, the process comprising:
receiving first user input that invokes a feedback mode in a software application, wherein the software application includes a plurality of user interface elements;
in response to invoking the feedback mode, disabling a first subset of the user interface elements, and associating a second subset of the user interface elements with display of a feedback panel;
displaying the feedback panel in response to selection of a particular user interface element in the second subset;
receiving second user input via the feedback panel;

harvesting status data associated with the software application, wherein the status data includes an identification of a feature associated with the particular user interface element when the feedback mode is not activated; and sending the second user input and the status data to a feedback administration server.

19. The non-transitory computer readable medium of claim 18, wherein the second user input is selected from a group consisting of a selected ranking and a textual input.

20. The non-transitory computer readable medium of claim 18, wherein the process further comprises:

making a determination that the feedback administration server is not accessible; and caching the second user input and the status data in an offline data cache.

\* \* \* \* \*